(12) United States Patent
Yang et al.

(10) Patent No.: US 12,531,749 B2
(45) Date of Patent: Jan. 20, 2026

(54) DATA PROCESSING METHOD, APPARATUS AND COMPUTER READABLE STORAGE MEDIUM FOR IMPROVING SECURITY OF DATA STORAGE, BASED ON TRUSTED EXECUTION ENVIRONMENT

(71) Applicants: BEIJING VOLCANO ENGINE TECHNOLOGY CO., LTD., Beijing (CN); LEMON INC., Grand Cayman (KY)

(72) Inventors: Xinying Yang, Beijing (CN); Ruide Zhang, Los Angeles, CA (US)

(73) Assignees: BEIJING VOLCANO ENGINE CO., LTD., Beijing (CN); LEMON INC., Grand Cayman (KY)

( * ) Notice: Subject to any disclaimer, the term of this patent is extended or adjusted under 35 U.S.C. 154(b) by 138 days.

(21) Appl. No.: 18/512,406

(22) Filed: Nov. 17, 2023

(65) Prior Publication Data

US 2024/0187253 A1 Jun. 6, 2024

(30) Foreign Application Priority Data

Dec. 5, 2022 (CN) .......................... 202211548301.9

(51) Int. Cl.
*H04L 9/40* (2022.01)
*H04L 9/30* (2006.01)
*H04L 9/32* (2006.01)

(52) U.S. Cl.
CPC .............. *H04L 9/3247* (2013.01); *H04L 9/30* (2013.01); *H04L 9/3297* (2013.01)

(58) Field of Classification Search
None
See application file for complete search history.

(56) References Cited

U.S. PATENT DOCUMENTS

| | | | |
|---|---|---|---|
| 2004/0054901 | A1 | 3/2004 | England et al. |
| 2017/0103378 | A1* | 4/2017 | Pan ..................... G06Q 20/3229 |
| 2017/0163629 | A1* | 6/2017 | Law ..................... H04L 63/0823 |

(Continued)

FOREIGN PATENT DOCUMENTS

| | | |
|---|---|---|
| CN | 101084487 A | 12/2007 |
| CN | 107835185 A | 3/2018 |

(Continued)

OTHER PUBLICATIONS

European Search Report for EP Patent Application No. 23209470.6, Issued on Apr. 9, 2024, 8 pages.

(Continued)

*Primary Examiner* — William J. Goodchild

(57) ABSTRACT

The present disclosure relates to a data processing method, apparatus and computer readable storage medium, and relates to the technical fields of data storage and computer. The method of the present disclosure includes: sending a digest of data to be stored to a trusted execution environment; receiving combined information and a signature thereof returned by the trusted execution environment, wherein the combined information comprises the digest of the data to be stored, a timestamp and a monotonic counter value which are generated by the trusted execution environment and correspond to the data to be stored; and storing the data to be stored, the combined information and the signature.

20 Claims, 3 Drawing Sheets

```
┌─────────────────────────────────────────┐
│   Send a digest of data to be stored    │ ─── S102
│       to a trusted execution            │
│            environment                  │
└─────────────────────────────────────────┘
                    │
                    ▼
┌─────────────────────────────────────────┐
│  Receive a the combined information     │ ─── S104
│  and a signature thereof returned by    │
│    the trusted execution environment    │
└─────────────────────────────────────────┘
                    │
                    ▼
┌─────────────────────────────────────────┐
│  Store the data to be stored, the       │ ─── S106
│    combined information and the         │
│              signature                  │
└─────────────────────────────────────────┘
```

(56) References Cited

U.S. PATENT DOCUMENTS

2020/0233849 A1 7/2020 Chitkara et al.
2021/0049716 A1 2/2021 Li

FOREIGN PATENT DOCUMENTS

| CN | 109508562 A | 3/2019 |
| CN | 110033259 A | 7/2019 |
| CN | 110347745 A | 10/2019 |
| CN | 110427368 A | 11/2019 |
| CN | 110750506 A | 2/2020 |
| CN | 111444528 A | 7/2020 |
| CN | 112214780 A | 1/2021 |
| CN | 112487084 A | 3/2021 |
| CN | 112711774 A | 4/2021 |
| CN | 112905126 A | 6/2021 |
| CN | 114691669 A | 7/2022 |
| CN | 114726536 A | 7/2022 |
| CN | 114884714 A | 8/2022 |
| CN | 115225285 A | 10/2022 |
| JP | 2002244554 A | 8/2002 |

OTHER PUBLICATIONS

Sinha et al., "VeritasDB: High Throughput Key-Value Store with Integrity", Cryptology ePrint Archive, Sep. 4, 2018, pp. 1-15.
Tang et al., "Log-Structure Authenticated Data Storage with Minimal Trust", , IACR, International Association for Cryptologic Research, pp. 1-17.
Notice of Opinion on the First Review for Chinese Application No. 202211548301.9, mailed on Nov. 15, 2024, 14 pages.
Zhang, et al., "Application of Trusted Time Stamp in Electronic Flle Security Protection," Beijing Archives, Issue 01, Jan. 2015.

* cited by examiner

DATA PROCESSING METHOD, APPARATUS AND COMPUTER READABLE STORAGE MEDIUM FOR IMPROVING SECURITY OF DATA STORAGE, BASED ON TRUSTED EXECUTION ENVIRONMENT

CROSS-REFERENCE TO RELATED APPLICATIONS

This application claims the priority of Chinese Application for Invention No. 202211548301.9, filed to the Patent Office of the People's Republic of China on Dec. 5, 2022, the entire content of which is incorporated herein by reference.

TECHNICAL FIELD

The present disclosure relates to the technical fields of data storage and computer, and in particular, to a data processing method and apparatus, and a computer-readable storage medium.

BACKGROUND

With the development and application of database technology, people in the industry pay more and more attentions to security issues of database. How to improve security of data storage in the database is always a focus of intensive research by relevant technicians.

SUMMARY

According to some embodiments of the present disclosure, there is provided a data processing method, comprising: sending a digest of data to be stored to a trusted execution environment; receiving combined information and a signature thereof returned by the trusted execution environment, wherein the combined information comprises the digest of the data to be stored, a timestamp and a monotonic counter value which are generated by the trusted execution environment and correspond to the data to be stored; and storing the data to be stored, the combined information and the signature.

In some embodiments, the method further comprises: determining whether stored data is tampered with or not, according to combined information and a signature(s) corresponding to the stored data.

In some embodiments, the stored data comprises one or more pieces of data, and the determining whether the stored data is tampered with or not, according to the combined information and the signature(s) corresponding to the stored data comprises, for each piece of the one or more pieces of data: generating a digest of the piece of data, and comparing the generated digest with a digest in combined information corresponding to the piece of data; in response to the generated digest being consistent with the digest in the combined information, verifying a signature corresponding piece of data by using a public key corresponding to the trusted execution environment and the combined information corresponding to the piece of data; and in response to a successful verification of the signature corresponding to the piece of data, determining that the piece of data is not tampered with.

In some embodiments, the determining whether the stored data is tampered with or not, according to the combined information and the signature(s) corresponding to the stored data further comprises, for a firstly stored piece of data in a preset data table among the one or more pieces of data: acquiring a first timestamp and a first monotonic counter value from the trusted execution environment, and determining that there is no data deleted before the firstly stored piece of data, in a case where a timestamp corresponding to the firstly stored piece of data is equal to the first timestamp and a monotonic counter value corresponding to the firstly stored piece of data is equal to the first monotonic counter value; and/or determining that there is no data deleted or inserted between the firstly stored piece of data and a next piece of data, in a case where the timestamp corresponding to the firstly stored piece of data is earlier than a timestamp corresponding to the next piece of data, and the monotonic counter value corresponding to the firstly stored piece of data and a monotonic counter value corresponding to the next piece of data are consecutive.

In some embodiments, the determining whether the stored data is tampered with or not, according to the combined information and the signature(s) corresponding to the stored data further comprises, for each intermediate piece of data which is neither lastly nor firstly stored in a preset data table among the one or more pieces of data: determining that there is no data deleted or inserted between the intermediate piece of data and a previous piece of data, in a case where a timestamp corresponding to the intermediate piece of data is later than a timestamp corresponding to the previous piece of data, and a monotonic counter value corresponding to the intermediate piece of data and a monotonic counter value corresponding to the previous piece of data are consecutive; and/or determining that there is no data deleted or inserted between the intermediate piece of data and a next piece of data, in a case where the timestamp corresponding to the intermediate piece of data is earlier than a timestamp corresponding to the next piece of data, and the monotonic counter value corresponding to the intermediate piece of data and a monotonic counter value corresponding to the next piece of data are consecutive.

In some embodiments, the determining whether the stored data is tampered with or not, according to the combined information and the signature(s) corresponding to the stored data further comprises, for a lastly stored piece of data in a preset data table among the one or more pieces of data: determining that there is no data deleted or inserted between the lastly stored piece of data and a previous piece of data, in the case where a timestamp corresponding to the lastly stored piece of data is later than a timestamp corresponding to the previous piece of data, and a monotonic counter value corresponding to the lastly stored piece of data and a monotonic counter value corresponding to the previous piece of data are consecutive; and/or acquiring a current monotonic counter value from the trusted execution environment, and determining that there is no data deleted after the lastly stored piece of data, in the case where the timestamp corresponding to the lastly stored piece of data is earlier than a current time moment, and the monotonic counter value corresponding to the lastly stored piece of data is the same as the current monotonic counter value.

In some embodiments, the method further comprises: reading a type of a preset data table where the stored data is located, wherein the type of the preset data table is configured to be a first type or a second type, the first type represents that the stored data in the preset data table is verified based on the trusted execution environment, and the second type represents that the stored data in the preset data table is verified based on a mode other than the trusted execution environment, wherein the determining whether the stored data is tampered with or not, according to the combined information and the signature(s) corresponding to the stored data comprises: in case that the type of the preset data table where the stored data is located is the first type, determining whether the stored data is tampered with or not, according to the combined information and the signature(s) corresponding to the stored data.

In some embodiments, the sending the digest of data to be stored to the trusted execution environment comprises: g generating the digest of the data to be stored; and calling predefined components inside the trusted execution environment and sending the digest of the data to be stored to the trusted execution environment through an interface of the trusted execution environment.

In some embodiments, the predefined components comprise: a timer component configured to generate a current timestamp as the timestamp corresponding to the data to be stored in response to receiving the digest of the data to be stored; a monotonic counter component configured to generate a current monotonic counter value as the monotonic counter value corresponding to the data to be stored according to a preset monotonic direction and a preset step size; and a signature component configured to sign binary data composed of the digest of the data to be stored, and the timestamp and the monotonic counter value corresponding to the data to be stored.

In some embodiments, the method further comprises: creating the trusted execution environment, and configuring the predefined components to execute in the trusted execution environment; and initializing the timer component and the monotonic counter component in the trusted execution environment.

In some embodiments, the storing the data to be stored, the combined information and the signature comprises: writing the data to be stored into a preset data table of a database, and writing the combined information and the signature into a preset column of a row where the data to be stored is located, wherein the preset column comprises an implicit column.

According to other embodiments of the present disclosure, there is provided a data processing apparatus comprising: a sending module configured to send a digest of data to be stored to a trusted execution environment; a receiving module configured to receive combined information and a signature thereof returned by the trusted execution environment, wherein, the combined information comprises the digest of the data to be stored, a timestamp and a monotonic counter value which are generated by the trusted execution environment and correspond to the data to be stored; and a storage module configured to store the data to be stored, the combined information and the signature.

According to still other embodiments of the present disclosure, there is provided a data processing apparatus comprising: a processor; and a memory coupled to the processor, configured to store instructions which, when executed by the processor, cause the processor to perform the data processing method of any of the embodiments described above.

According to still further embodiments of the present disclosure, there is provided a non-transitory computer-readable storage medium having a computer program stored thereon, wherein the program, when executed by a processor, cause the processor to implement the data processing method of any of the embodiments described above.

According to still further embodiments of the present disclosure, there is provided a computer program comprising: instructions, which when executed by a processor, cause the processor to perform the data processing method of any of the embodiments described above.

Other features of the present disclosure and advantages thereof will become apparent from the following detailed description of exemplary embodiments of the present disclosure with reference to the accompanying drawings.

BRIEF DESCRIPTION OF THE DRAWINGS

In order to more clearly illustrate the embodiments of the present disclosure or the technical solutions in the prior art, the drawings used in describing the embodiments or the prior art will be briefly described below, and it is obvious that the drawings in the following description are only some embodiments of the present disclosure, and other drawings can be obtained by those skilled in the art according to these drawings without paying out any creative effort.

DETAILED DESCRIPTION

The technical solutions in the embodiments of the present disclosure will be clearly and completely described below with reference to the accompanying drawings in the embodiments of the present disclosure, and it is obvious that the described embodiments are only a part of the embodiments of the present disclosure, rather than all embodiments. The following description of at least one exemplary embodiment is merely illustrative in nature and is in no way intended to limit the present disclosure, its application, or uses. All other embodiments, which can be derived by a person skilled in the art from the embodiments disclosed herein without paying out any creative effort, shall fall within the scope of protection of the present disclosure.

A technical problem to be solved by the present disclosure is: how to improve the security of the data storage.

Improving a storage mode of data helps to improve the security of data in the database. The present disclosure provides a data processing method, to improve the security of data storage in the database based on a hardware protection mechanism. The following description is made with reference to FIGS. 1~2.

Figure 1:
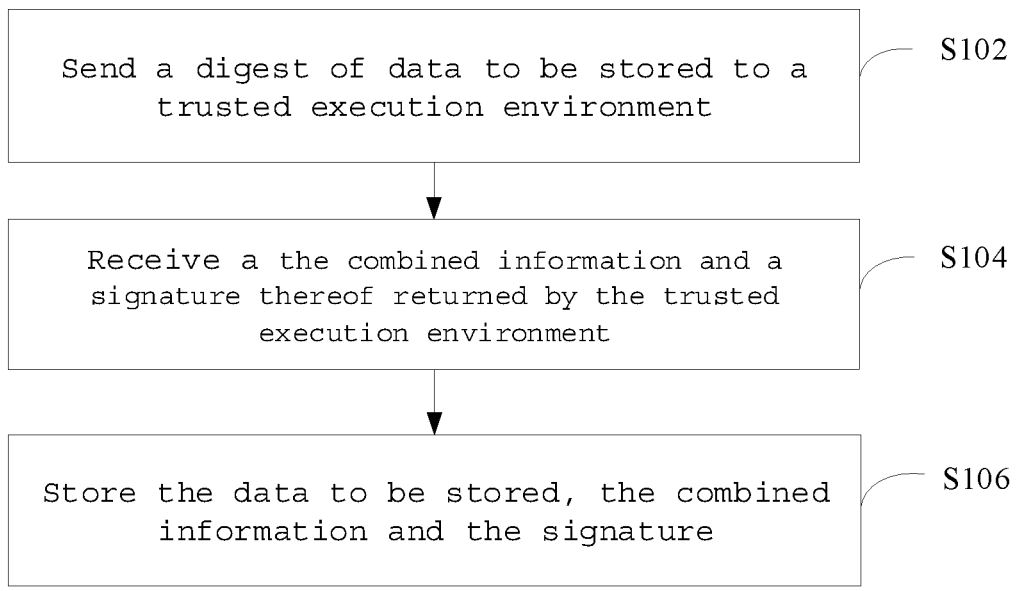
FIG. 1 shows a schematic flowchart of a data processing method according to some embodiments of the present disclosure.

FIG. 1 is a schematic flowchart of a data processing method according to some embodiments of the present disclosure. As shown in FIG. 1, the method of the embodiment comprises: steps S102 to S106.

In step S102, a digest of data to be stored is sent to a trusted execution environment.

The data to be stored is, for example, data to be inserted into a preset data table through a DBMS (Database Management System). The data to be stored can be any form of data such as structured storage data, unstructured storage data, or semi-structured storage data.

A Trusted execution environment (TEE) is a safe zone constructed based on hardware (CPU, memory, etc.), to ensure that programs and data running inside it are protected in terms of confidentiality and integrity. The trusted execution environment can be specifically implemented by using a SGX (Software Guard extensions) technology to create an Enclave, and is not limited to the example given.

In some embodiments, the trusted execution environment may be created first, and predefined components are configured to execute in the trusted execution environment. The predefined components may comprise: a timer component, a monotonic counter component, and a signature component, which will be described in detail in subsequent embodiments. Further, the timer component and the monotonic counter component in the trusted execution environment are initialized. The monotonic counter component allocates a corresponding monotonic counter to the preset data table, and different data tables correspond to different monotonic counters.

For example, Enclave is created as an independent security environment for protecting the predefined components and data. When creating the Enclave, the predefined components are configured to run in the Enclave. The predefined components are trusted components that are located inside a safe zone and execute in EPC (Enclave Page Cache). The Enclave can be developed and deployed using a confidential VM (Virtual Machine) with SGX-enabled. After the Enclave is created, the Enclave may be initialized.

In some embodiments, the digest of the data to be stored is generated; predefined components inside the trusted execution environment are called and the digest of the data to be stored is sent to the trusted execution environment through an interface of the trusted execution environment.

For example, a hash function is used to generate the digest of the data to be stored. A first component for generating the digest of the data to be stored is located outside the trusted execution environment. Through the interface, the predefined components (namely second components) inside the trusted execution environment may be called and the digest of the data to be stored is sent to inside the trusted execution environment to perform secure operations. For example, the first component may call the second components in the Enclave through a first hardware instruction, and the first hardware instruction may switch a mode of a processor to an Enclave mode. The first component may be configured in the DBMS.

In some embodiments, in the trusted execution environment, a timestamp and a monotonic counter value corresponding to the data to be stored are generated, and the digest of the data to be stored and the timestamp and the monotonic counter value are combined to obtain combined information, and the combined information is signed.

In some embodiments, the timer component is configured to generate a current timestamp as the timestamp corresponding to the data to be stored in response to receiving the digest of the data to be stored, the monotonic counter component is configured to generate a current monotonic counter value as the monotonic counter value corresponding to the data to be stored according to a preset monotonic direction and a preset step size, and the signature component is configured to sign binary data composed of the digest of the data to be stored, and the timestamp and the monotonic counter value corresponding to the data to be stored.

For example, the monotonic counter is monotonically increasing with a preset step size of 1. For example, if the monotonic counter value corresponding to a previous piece of data to be stored is 1, a generated monotonic counter value corresponding to current data to be stored is 2.

The digest of the data to be stored and the timestamp and monotonic counter value corresponding to the data to be stored are combined into binary data in a preset order, and the binary data is signed by the signature component in the trusted execution environment. The signature component can comprise a private key for signing. For example, the signing process comprises, performing a hash operation on the combined information to obtain a hash value corresponding to the combined information, and using the private key to encrypt the hash value corresponding to the combined information to obtain the signature. The signature obtained by signing by the trusted execution environment cannot be tampered with, and thereafter can be used to verify whether each item in the combined information is tampered with.

In step S104, the combined information and the signature thereof returned by the trusted execution environment are received.

The combined information comprises the digest of the data to be stored, and the timestamp and monotonic counter value corresponding to the data to be stored generated by the trusted execution environment. For example, callback may be made to the first component by the trusted execution environment to return the combined information and the signature of the combined information. For example, a second component in the Enclave can call the first component through a second hardware instruction, and the second hardware instruction can switch the processor out of the Enclave mode.

In step S106, the data to be stored, the combined information and the signature are stored. The combined information and the signature are stored in a position corresponding to a position which the data to be stored is stored in.

In some embodiments, the data to be stored is written in the preset data table of a database, and the combined information and the signature thereof are written into a preset column of a row where the data to be stored is located, wherein the preset column comprises an implicit column. The combined information and the signature thereof are written into the implicit column, to have a hiding effect and improve the security. A column name of the implicit column can be configured to indicate that the data stored in the column is signed by the trusted execution environment, e.g. tee_sign.

Initially, a preset data table can be created, the type of the preset data table is configured to be a first type. The first type can represent that the stored data in the preset data table is verified based on the trusted execution environment, and a second type can represent that the stored data in the preset data table is verified based on a mode other than the trusted execution environment. Subsequently, how to audit, trace and verify the data in the preset data table can be determined according to the type of the preset data table. The preset data table is a trusted data table (Immunable), and any tampering with the data in the preset data table can be found. For example, DDL (Data Definition Language) can be used to create the preset Data table and to configure the type of the preset data table. For example, TYPE in DDL is used to define the type of the preset data table and a type of the implicit column, wherein a default value LOCAL means that the stored data in the preset data table is verified based on a software method (VE-S), i.e., the second type, while TEE means that the stored data in the preset data table is verified based on a hardware method, i.e., based on the trusted execution environment (VE-H), i.e., the first type. The software method adopts a ledger table form for storage, i.e., based on ledger technology, and a digest of a previous piece of data is introduced when calculating the digest of each piece of data, which will not be described repeatedly in detail here.

According to the solution of the embodiments above, the digest of the data to be stored is sent to the trusted execution environment. The trusted execution environment generates the timestamp and the monotonic counter value corresponding to the data to be stored, combines the timestamp and the monotonic counter value with the digest of the data to be stored to obtain the combined information, and signs the combined information. Then, the combined information and the signature thereof returned by the trusted execution environment are stored with the data to be stored. The trusted execution environment is a safe zone constructed based on hardware, so that programs and data running inside the trusted execution environment are protected in terms of confidentiality and integrity. The trusted execution environment adopts a hardware protection method, in which the security of data storage can be effectively improved by generating the timestamp, the monotonic counter value and the signature by the trusted execution environment, and thus is more secure than a software protection method. In addition, due to the setting of the timestamp and the monotonic counter value corresponding to the data to be stored, a deletion of any data or an insertion of illegal data can be found in time, thereby further improving the security of data storage.

In some embodiments, whether the stored data is tampered with is determined according to the combined information and the signature corresponding to the stored data. In some other embodiments, a type of a preset data table where the stored data is located is read, wherein the first type represents that the stored data in the preset data table is verified based on the trusted execution environment, and the second type represents that the stored data in the preset data table is verified based on a mode other than the trusted execution environment; in case that the type of the preset data table where the stored data is located is the first type, whether the stored data is tampered with or not is determined according to the combined information and the signature(s) corresponding to the stored data. The process of verifying the stored data is described below in conjunction with FIG. 2.

Figure 2:
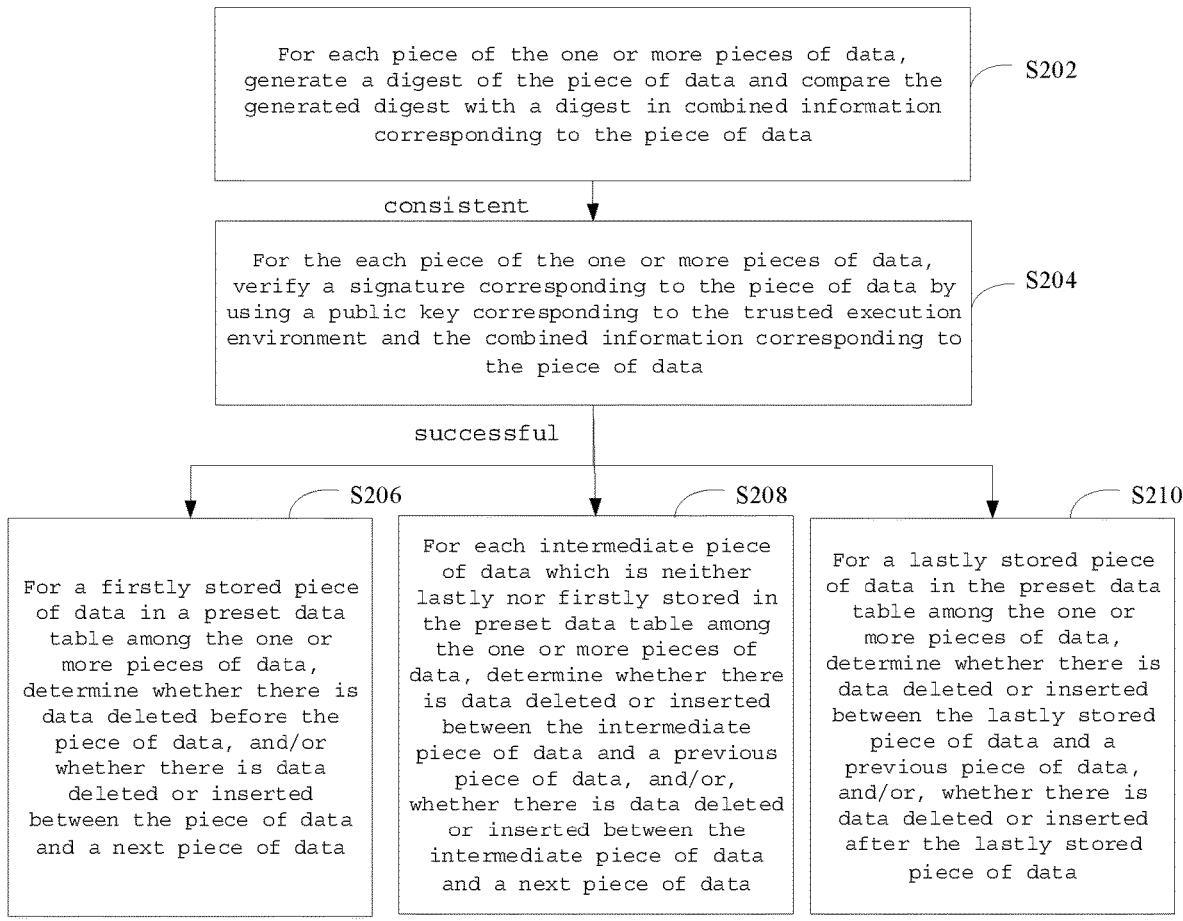
FIG. 2 shows a schematic flowchart of a data processing method according to some other embodiments of the present disclosure.

FIG. 2 is a schematic flowchart of a data processing method according to some other embodiments of the present disclosure. As shown in FIG. 2, the method of the embodiment comprises: steps S202 to S210.

Any one or more pieces of stored data, or part of one piece of stored data, or all data in the preset data table can be verified. That is, the stored data may comprise one or more pieces of data.

In step S202, for each piece of the one or more pieces of data, a digest of the piece of data is generated and compared with a digest in combined information corresponding to the piece of data, and if the generated digest is consistent with the digest in the combined information, step S204 is executed.

The one or more pieces of data can be read from the preset data table, and the digest of each piece of the one or more pieces of data is generated.

In step S204, for the each piece of the one or more pieces of data, a signature corresponding to the piece of data is verified by using a public key corresponding to the trusted execution environment and the combined information corresponding to the piece of data. IF the verification of the piece of data is successful, it is determined that the piece of data is not tampered with, otherwise, it is determined that the piece of data is tampered with. If the verification is successful, steps S206-210 are executed.

For each piece of the one or more pieces of data, after the public key corresponding to the trusted execution environment is searched, the signature corresponding to the piece of data can be decrypted with the public key to obtain a hash value of the combined information corresponding to the piece of data, the combined information corresponding to the piece of data is hashed to obtain another hash value; the two hash values are compared, and if they are consistent, the verification is successful. By means of the verification, it can be determined whether the combined information corresponding to the each piece of the one or more pieces of data is tampered with. Whether the each piece of the one or more pieces of data is tampered with can be determined through steps S202 and S204.

In some embodiments, whether there is data deleted or inserted before and/or after each piece of the one or more pieces of data is determined according to the timestamp and monotonic counter value corresponding to the each piece of the one or more pieces of data.

The method of the present disclosure can not only determine whether any piece of data is tampered with or not, but also determine whether any data is deleted or illegal data is inserted or not. The deleted or inserted data is usually hard to be found and is also an issue hard to be solved in database security issues. In the present disclosure, by applying the timestamp and the monotonic counter value, ae deletion or an insertion of data can be detected in time, to improve the security of data storage.

In step S206, for a firstly stored piece of data in a preset data table among the one or more pieces of data, it is determined whether there is data deleted before the piece of data, and/or whether there is data deleted or inserted between the piece of data and a next piece of data.

In some embodiments, for the firstly stored piece of data in the preset data table among the one or more pieces of data, a first timestamp and a first monotonic counter value are acquired from the trusted execution environment; it is determined that there is no data deleted before the firstly stored piece of data, in a case where a timestamp corresponding to the firstly stored piece of data is equal to the first timestamp and a monotonic counter value corresponding to the firstly stored piece of data is equal to the first monotonic counter value; and/or, it is determined that there is no data deleted or inserted between the firstly stored piece of data and the next piece of data, in a case where the timestamp corresponding to the firstly stored piece of data is earlier than a timestamp corresponding to the next piece of data, and the monotonic counter value corresponding to the firstly stored piece of data and a monotonic counter value corresponding to the next piece of data are consecutive.

In step S208, for each intermediate piece of data which is neither lastly nor firstly stored in the preset data table among the one or more pieces of data, it is determined whether there is data deleted or inserted between the intermediate piece of data and a previous piece of data, and/or, whether there is data deleted or inserted between the intermediate piece of data and a next piece of data.

In some embodiments, for the each intermediate piece of data which is neither lastly nor firstly stored in the preset data table among the one or more pieces of data, it is determined that there is no data deleted or inserted between the intermediate piece of data and the previous piece of data, in the case where a timestamp corresponding to the lastly stored piece of data is later than a timestamp corresponding to the previous piece of data, and a monotonic counter value corresponding to the lastly stored piece of data and a monotonic counter value corresponding to the previous piece of data are consecutive; and/or, it is determined that there is no data deleted or inserted between the intermediate piece of data and the next piece of data, in the case where the timestamp corresponding to the lastly stored piece of data is earlier than a current time moment, and the monotonic counter value corresponding to the lastly stored piece of data is the same as the current monotonic counter value.

In step S210, for a lastly stored piece of data in the preset data table among the one or more pieces of data, it is determined whether there is data deleted or inserted between the lastly stored piece of data and a previous piece of data, and/or, whether there is data deleted or inserted after the lastly stored piece of data.

In some embodiments, for a lastly stored piece of data in the preset data table among the one or more pieces of data, it is determined that there is no data deleted or inserted between the lastly stored piece of data and the previous piece of data, in the case where a timestamp corresponding to the lastly stored piece of data is later than a timestamp corresponding to the previous piece of data, and a monotonic counter value corresponding to the lastly stored piece of data and a monotonic counter value corresponding to the previous piece of data are consecutive; and/or, a current monotonic counter value from the trusted execution environment is acquired and it is determined that there is no data deleted after the lastly stored piece of data, in the case where the timestamp corresponding to the lastly stored piece of data is earlier than a current time moment, and the monotonic counter value corresponding to the lastly stored piece of data is the same as the current monotonic counter value.

For multiple pieces of data (which may be all data in the entire preset data table), the timestamps and the monotonic counter values of the multiple pieces of data can be traversed according to a storage sequence from front to back in the preset data table. If the timestamps are incremented in turn, and the monotonic counter values are consecutive, it is determined that there is no data deleted or inserted among the multiple pieces of data. Otherwise, it is determined that there is data deleted or data among the multiple pieces of data. In this way, it can be determined whether there is intermediate data deleted or inserted, but it cannot be determined whether there is data deleted before the firstly stored piece of data or after the lastly stored piece of data. The monotonic counter values being consecutive means that, a monotonic direction of the monotonic counter values of the multiple pieces of data is a preset monotonic direction, and a difference between the monotonic counter values of any two adjacent pieces of data is a preset step size.

For the firstly stored piece of data in the preset data table, the first timestamp and the first monotonic counter value from the trusted execution environment is acquire. In addition to the determinations as to whether the first timestamp is less than a timestamp of subsequent data and whether the first monotonic counter value and a monotonic counter value of the subsequent data are consecutive, it is also needed to determine whether the timestamp corresponding to the firstly stored piece of data is equal to the first timestamp and whether the monotonic counter value corresponding to the firstly stored piece of data is equal to the first monotonic counter value. If yes, then it is determined that there is no data deleted before the firstly stored piece of data in the preset data table, and the firstly stored piece of data is not illegal inserted data.

For the lastly stored piece of data in the preset data table, the current monotonic counter value from the trusted execution environment is acquired. The multiple pieces of data can be traversed from the first stored piece of data to the lastly stored piece of data according to the storage sequence from front to back in the preset data table. In addition to the determinations as to whether the timestamp corresponding to the lastly stored piece of data and the timestamp corresponding to the previous piece of data are incremented in turn and whether the monotonic counter value corresponding to the lastly stored piece of data and the monotonic counter value corresponding to the previous piece of data are consecutive, it is also needed to determine whether the monotonic counter value corresponding to the lastly stored piece of data is equal to the current monotonic counter value. If yes, then it is determined that there is no data deleted after the lastly stored piece of data in the preset data table, and the lastly stored piece of data is not inserted illegal data.

For each piece of data, it may be only determined whether there is data deleted or inserted before the piece of data, or whether there is data deleted or inserted after the piece of data. The deleted or inserted data can be one or more pieces, and can be determined based on a difference between monotonic counter values corresponding to two adjacent pieces of data.

The method of the above embodiments can verify the integrity of the stored data, and can detect in time that data is tampered with, illegal data is inserted, and data is deleted. Moreover, the method of the above embodiments can make verifications for any stored data, and the deleted or inserted data can be found only by comparing the timestamp and the monotonic counter value, which improves the verification efficiency.

The present disclosure also provides a data processing apparatus, which is described below in conjunction with FIG. 3.

Figure 3:
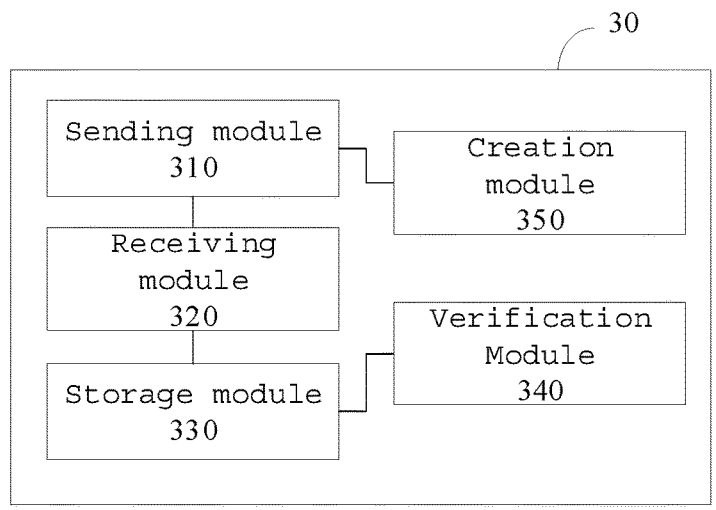
FIG. 3 shows a schematic structural diagram of a data processing apparatus according to some embodiments of the present disclosure.

FIG. 3 is a schematic structural diagram of a data processing apparatus according to some embodiments of the present disclosure. As shown in FIG. 3, the apparatus 30 of the embodiment comprises: a sending module 310, a receiving module 320, and a storage module 330.

The sending module 310 is configured to send a digest of data to be stored to a trusted execution environment.

In some embodiments, the sending module 310 is configured to generate the digest of the data to be stored; call predefined components inside the trusted execution environment and send the digest of the data to be stored to the trusted execution environment through an interface of the trusted execution environment.

In some embodiments, the predefined components comprise: a timer component configured to generate a current timestamp as the timestamp corresponding to the data to be stored in response to receiving the digest of the data to be stored; a monotonic counter component configured to generate a current monotonic counter value as the monotonic counter value corresponding to the data to be stored according to a preset monotonic direction and a preset step size; and a signature component configured to sign binary data composed of the digest of the data to be stored, and the timestamp and the monotonic counter value corresponding to the data to be stored.

The receiving module 320 is configured to receive combined information and a signature thereof returned by the trusted execution environment, wherein the combined information comprises the digest of the data to be stored, a timestamp and a monotonic counter value which are generated by the trusted execution environment and correspond to the data to be stored.

The storage module 330 is configured to store the data to be stored, the combined information and the signature.

In some embodiments, the storage module 330 is configured to write the data to be stored into a preset data table of a database, and write the combined information and the signature into a preset column of a row where the data to be stored is located, wherein the preset column comprises an implicit column.

In some embodiments, the apparatus 30 further comprises: a verification module 340 configured to determine whether stored data is tampered with or not, according to combined information and a signature(s) corresponding to the stored data.

In some embodiments, the stored data comprises one or more pieces of data, and the verification module 340 is configured to, for each piece of the one or more pieces of data: generate a digest of the piece of data, and compare the generated digest with a digest in combined information corresponding to the piece of data; in response to the generated digest being consistent with the digest in the combined information, verify a signature corresponding to the piece of data by using a public key corresponding to the trusted execution environment and the combined information corresponding to the piece of data; and in response to a successful verification of the signature corresponding to the piece of data, determine that the piece of data is not tampered with.

In some embodiments, the verification module 340 is further configured to, for a firstly stored piece of data in a preset data table among the one or more pieces of data: acquire a first timestamp and a first monotonic counter value from the trusted execution environment, and determine that there is no data deleted before the firstly stored piece of data, in a case where a timestamp corresponding to the firstly stored piece of data is equal to the first timestamp and a monotonic counter value corresponding to the firstly stored piece of data is equal to the first monotonic counter value; and/or determine that there is no data deleted or inserted between the firstly stored piece of data and a next piece of data, in a case where the timestamp corresponding to the firstly stored piece of data is earlier than a timestamp corresponding to the next piece of data, and the monotonic counter value corresponding to the firstly stored piece of data and a monotonic counter value corresponding to the next piece of data are consecutive.

In some embodiments, the verification module 340 is further configured to, for each intermediate piece of data which is neither lastly nor firstly stored in a preset data table among the one or more pieces of data: determine that there is no data deleted or inserted between the intermediate piece of data and a previous piece of data, in a case where a timestamp corresponding to the intermediate piece of data is later than a timestamp corresponding to the previous piece of data, and a monotonic counter value corresponding to the intermediate piece of data and a monotonic counter value corresponding to the previous piece of data are consecutive; and/or determine that there is no data deleted or inserted between the intermediate piece of data and a next piece of data, in a case where the timestamp corresponding to the intermediate piece of data is earlier than a timestamp corresponding to the next piece of data, and the monotonic counter value corresponding to the intermediate piece of data and a monotonic counter value corresponding to the next piece of data are consecutive.

In some embodiments, the verification module 340 is further configured to, for a lastly stored piece of data in a preset data table among the one or more pieces of data: determine that there is no data deleted or inserted between the lastly stored piece of data and a previous piece of data, in the case where a timestamp corresponding to the lastly stored piece of data is later than a timestamp corresponding to the previous piece of data, and a monotonic counter value corresponding to the lastly stored piece of data and a monotonic counter value corresponding to the previous piece of data are consecutive; and/or acquire a current monotonic counter value from the trusted execution environment, and determine that there is no data deleted after the lastly stored piece of data, in the case where the timestamp corresponding to the lastly stored piece of data is earlier than a current time moment, and the monotonic counter value corresponding to the lastly stored piece of data is the same as the current monotonic counter value.

In some embodiments, the verification module 340 is configured to read a type of a preset data table where the stored data is located, wherein the type of the preset data table is configured to be a first type or a second type, the first type represents that the stored data in the preset data table is verified based on the trusted execution environment, and the second type represents that the stored data in the preset data table is verified based on a mode other than the trusted execution environment, and in case that the type of the preset data table where the stored data is located is the first type, determine whether the stored data is tampered with or not, according to the combined information and the signature(s) corresponding to the stored data.

In some embodiments, the apparatus 30 further comprises: a creation module 350 configured to create the trusted execution environment, and configuring the predefined components to execute in the trusted execution environment; and initialize the timer component and the monotonic counter component in the trusted execution environment.

In some embodiments, the creation module 350 is further configured to create a preset data table; and configure the type of the preset data table to be a type representing the stored data in the preset data table is verified based on the trusted execution environment.

Each module in the above embodiments is respectively configured to perform a respective step in the data processing method in any of the above embodiments, and will not be described repeatedly in detail here.

The data processing apparatus in the embodiments of the present disclosure may each be implemented by various computing devices or computer systems, which are described below in conjunction with FIGS. 4 and 5.

Figure 4:
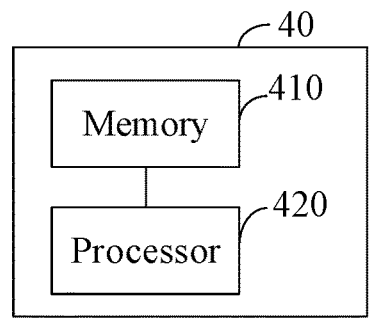
FIG. 4 shows a schematic structural diagram of a data processing apparatus according to some other embodiments of the present disclosure.

FIG. 4 is a schematic structural diagram of a data processing apparatus according to some other embodiments of the present disclosure. As shown in FIG. 4, the apparatus 40 of the embodiment comprises: a memory 410, and a processor 420 coupled to the memory 410, the processor 420 is configured to, according to instructions stored in the memory 410, perform the data processing method in any of the embodiments of the present disclosure.

The memory 410 may comprise, for example, a system memory, a fixed non-volatile storage media, etc. The system memory stores, for example, an operating system, an application program, a Boot Loader, a database, and other programs.

Figure 5:
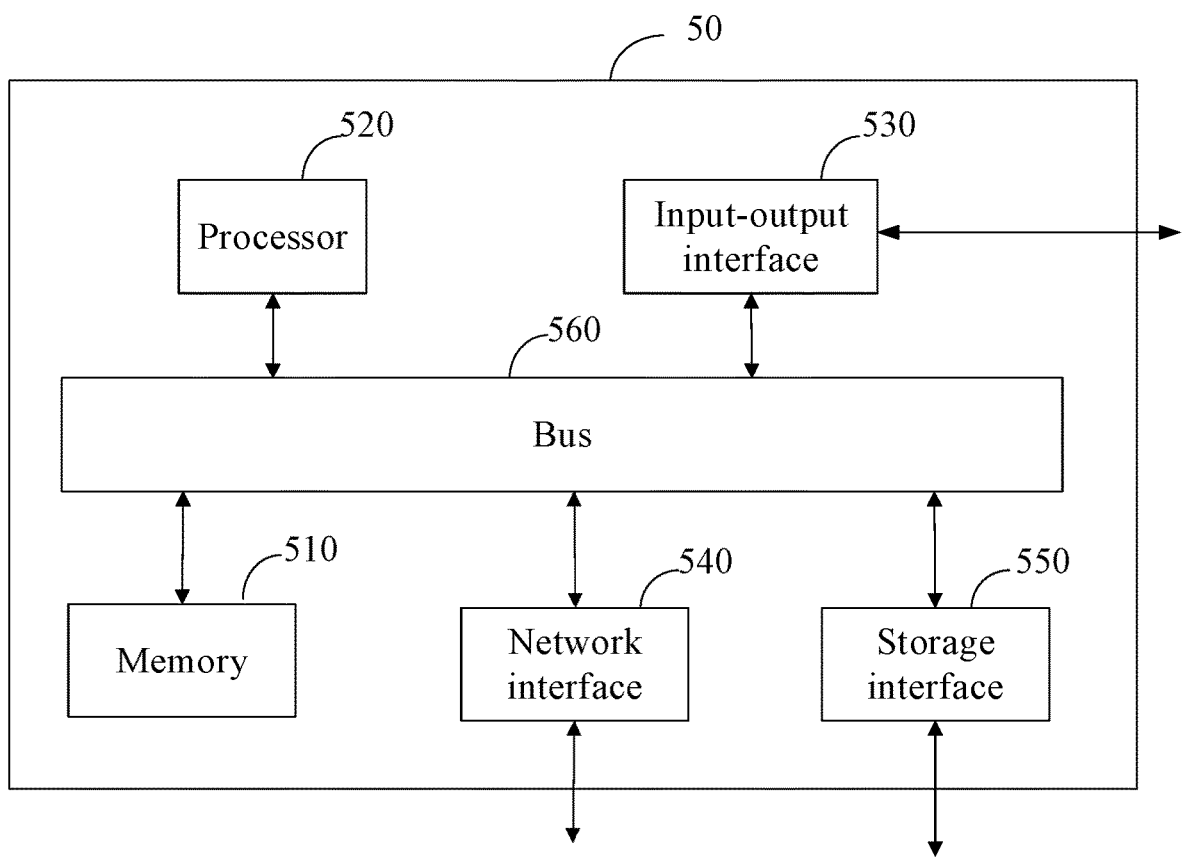
FIG. 5 shows a schematic structural diagram of a data processing apparatus according to further embodiments of the present disclosure.

FIG. 5 is a schematic structural diagram of a data processing apparatus according to further embodiments of the present disclosure. As shown in FIG. 5, the apparatus 50 of the embodiment comprises: a memory 510 and a processor 520, which are similar to the memory 410 and the processor 420 respectively. It can also comprise an input/output interface 530, a network interface 540, a storage interface 550, etc. These interfaces 530, 540, 550, and the memory 510 and the processor 520 may be connected through, for example, a bus 560. The input/output interface 530 provides connection interfaces for input/output devices such as a display, mouse, keyboard, and touch screen. The network interface 540 provides connection interfaces for various networked devices, such as a database server or a cloud storage server. The storage interface 550 provides connection interfaces for external storage devices such as a SD card and USB disk.

In the data processing apparatus 40/50 of the above embodiments, the memory and the processor can allocate part of the safe zone as the trusted execution environment, and the predefined components inside the trusted execution environment serve as instructions and can be executed in the trusted execution environment.

The present disclosure further provides a computer program comprising: instructions which, when executed by a processor, cause the processor to perform the data processing method as in any of the embodiments described above.

It should be appreciated by those skilled in the art that, the embodiments of the present disclosure may be provided as a method, system, or computer program product. Accordingly, the present disclosure may take a form of an entire hardware embodiment, an entire software embodiment, or an embodiment combining software and hardware aspects. Moreover, the present disclosure may take a form of a computer program product implemented on one or more non-transitory computer-readable storage media (comprising, but not limited to, a disk memory, CD-ROM, optical memory, etc.) having computer program code embodied therein.

The present disclosure is described with reference to flow diagrams and/or block diagrams of the method, apparatus (system) and computer program product according to the embodiments of the present disclosure. It should be understood that each flow and/or block of the flow diagrams and/or block diagrams, and a combination of flows and/or blocks in the flow diagrams and/or block diagrams, can be implemented by computer program instructions. These computer program instructions may be provided to a processor of a general-purpose computer, special-purpose computer, embedded processor, or other programmable data processing devices to produce a machine, such that the instructions which are executed through the processor of the computer or other programmable data processing devices create means for implementing the functions specified in one or more flows of the flow diagrams and/or one or more blocks of the block diagrams.

These computer program instructions may also be stored in a computer-readable memory that can guide a computer or other programmable data processing devices to work in a specific manner, such that the instructions stored in the computer-readable memory produce an article of manufacture comprising instruction means which implement the functions specified in one or more flows of the flow diagrams and/or one or more blocks of the block diagrams.

These computer program instructions may also be loaded onto a computer or other programmable data processing devices to cause a series of operational steps to be performed on the computer or other programmable devices to produce a computer-implemented process, such that the instructions which are executed on the computer or other programmable devices provide steps for implementing the functions specified in one or more flows of the flow diagrams and/or one or more blocks of the block diagrams.

The above merely describes the preferred embodiments of the present disclosure and is not intended to limit the present disclosure, and any modifications, equivalent substitutions, improvements and the like that are made within the spirit and principle of the present disclosure are intended to be comprised within the scope of protection of the present disclosure.

What is claimed is:

1. A data processing method, comprising:
   sending a digest of data to be stored to a trusted execution environment;
   receiving combined information and a signature thereof returned by the trusted execution environment, wherein the combined information comprises the digest of the data to be stored, a timestamp and a monotonic counter value which are generated by the trusted execution environment and correspond to the data to be stored; and
   storing the data to be stored, the combined information and the signature, comprising: writing the data to be stored into a preset data table of a database, and writing the combined information and the signature into a preset column of a row where the data to be stored is located, wherein the preset column comprises an implicit column.

2. The data processing method according to claim 1, further comprising:
   determining whether stored data is tampered with or not, according to combined information and a signature(s) corresponding to the stored data.

3. The data processing method according to claim 2, wherein the stored data comprises one or more pieces of data, and the determining whether the stored data is tampered with or not, according to the combined information and the signature(s) corresponding to the stored data comprises, for each piece of the one or more pieces of data:
   generating a digest of the piece of data, and comparing the generated digest with a digest in combined information corresponding to the piece of data;
   in response to the generated digest being consistent with the digest in the combined information, verifying a signature corresponding to the piece of data by using a public key corresponding to the trusted execution environment and the combined information corresponding to the piece of data; and
   in response to a successful verification of the signature corresponding to the piece of data, determining that the piece of data is not tampered with.

4. The data processing method according to claim 3, wherein the determining whether the stored data is tampered with or not, according to the combined information and the signature(s) corresponding to the stored data further comprises, for a firstly stored piece of data in a preset data table among the one or more pieces of data:
   acquiring a first timestamp and a first monotonic counter value from the trusted execution environment, and determining that there is no data deleted before the firstly stored piece of data, in a case where a timestamp corresponding to the firstly stored piece of data is equal to the first timestamp and a monotonic counter value corresponding to the firstly stored piece of data is equal to the first monotonic counter value; and/or
   determining that there is no data deleted or inserted between the firstly stored piece of data and a next piece of data, in a case where the timestamp corresponding to the firstly stored piece of data is earlier than a timestamp corresponding to the next piece of data, and the monotonic counter value corresponding to the firstly stored piece of data and a monotonic counter value corresponding to the next piece of data are consecutive.

5. The data processing method according to claim 3, wherein the determining whether the stored data is tampered with or not, according to the combined information and the signature(s) corresponding to the stored data further comprises, for each intermediate piece of data which is neither lastly nor firstly stored in a preset data table among the one or more pieces of data:
   determining that there is no data deleted or inserted between the intermediate piece of data and a previous piece of data, in a case where a timestamp corresponding to the intermediate piece of data is later than a timestamp corresponding to the previous piece of data, and a monotonic counter value corresponding to the intermediate piece of data and a monotonic counter value corresponding to the previous piece of data are consecutive; and/or
   determining that there is no data deleted or inserted between the intermediate piece of data and a next piece of data, in a case where the timestamp corresponding to the intermediate piece of data is earlier than a timestamp corresponding to the next piece of data, and the monotonic counter value corresponding to the intermediate piece of data and a monotonic counter value corresponding to the next piece of data are consecutive.

6. The data processing method according to claim 3, wherein the determining whether the stored data is tampered with or not, according to the combined information and the signature(s) corresponding to the stored data further comprises, for a lastly stored piece of data in a preset data table among the one or more pieces of data:
   determining that there is no data deleted or inserted between the lastly stored piece of data and a previous piece of data, in the case where a timestamp corresponding to the lastly stored piece of data is later than a timestamp corresponding to the previous piece of data, and a monotonic counter value corresponding to the lastly stored piece of data and a monotonic counter value corresponding to the previous piece of data are consecutive; and/or
   acquiring a current monotonic counter value from the trusted execution environment, and determining that there is no data deleted after the lastly stored piece of data, in the case where the timestamp corresponding to the lastly stored piece of data is earlier than a current time moment, and the monotonic counter value corresponding to the lastly stored piece of data is the same as the current monotonic counter value.

7. The data processing method according to claim 2, further comprising:
   reading a type of a preset data table where the stored data is located, wherein the type of the preset data table is configured to be a first type or a second type, the first type represents that the stored data in the preset data table is verified based on the trusted execution environment, and the second type represents that the stored data in the preset data table is verified based on a mode other than the trusted execution environment,
   wherein the determining whether the stored data is tampered with or not, according to the combined information and the signature(s) corresponding to the stored data comprises:
   in case that the type of the preset data table where the stored data is located is the first type, determining whether the stored data is tampered with or not, according to the combined information and the signature(s) corresponding to the stored data.

8. The data processing method according to claim 1, wherein the sending the digest of data to be stored to the trusted execution environment comprises:
   generating the digest of the data to be stored; and
   calling predefined components inside the trusted execution environment and sending the digest of the data to be stored to the trusted execution environment through an interface of the trusted execution environment.

9. The data processing method according to claim 8, wherein the predefined components comprise:
   a timer component configured to generate a current timestamp as the timestamp corresponding to the data to be stored in response to receiving the digest of the data to be stored;
   a monotonic counter component configured to generate a current monotonic counter value as the monotonic counter value corresponding to the data to be stored according to a preset monotonic direction and a preset step size; and
   a signature component configured to sign binary data composed of the digest of the data to be stored, and the timestamp and the monotonic counter value corresponding to the data to be stored.

10. The data processing method according to claim 9, further comprising:
    creating the trusted execution environment, and configuring the predefined components to execute in the trusted execution environment; and
    initializing the timer component and the monotonic counter component in the trusted execution environment.

11. A data processing apparatus comprising:
    a processor; and
    a memory coupled to the processor, configured to store instructions which, when executed by the processor, cause the processor to:
    send a digest of data to be stored to a trusted execution environment;
    receive combined information and a signature thereof returned by the trusted execution environment, wherein the combined information comprises the digest of the data to be stored, a timestamp and a monotonic counter value which are generated by the trusted execution environment and correspond to the data to be stored; and
    store the data to be stored, the combined information and the signature, comprising: writing the data to be stored into a preset data table of a database, and writing the combined information and the signature into a preset column of a row where the data to be stored is located, wherein the preset column comprises an implicit column.

12. The data processing apparatus according to claim 11, wherein the instructions when executed by the processor, further cause the processor to:
    determine whether stored data is tampered with or not, according to combined information and a signature(s) corresponding to the stored data.

13. The data processing apparatus according to claim 12, wherein the instructions when executed by the processor, further cause the processor to:
    read a type of a preset data table where the stored data is located, wherein the type of the preset data table is configured to be a first type or a second type, the first type represents that the preset data table is verified based on the trusted execution environment, and the second type represents that the preset data table is verified based on a mode other than the trusted execution environment, wherein the determining whether the stored data is tampered with or not, according to the combined information and the signature(s) corresponding to the stored data comprises:

in case that the type of the preset data table where the stored data is located is the first type, determining whether the stored data is tampered with or not, according to the combined information and the signature(s) corresponding to the stored data.

14. The data processing apparatus according to claim 11, wherein the sending the digest of data to be stored to the trusted execution environment comprises:

generating the digest of the data to be stored; and calling predefined components inside the trusted execution environment through an interface of the trusted execution environment and sending the digest of the data to be stored to the trusted execution environment.

15. A non-transitory computer-readable storage medium having a computer program stored thereon, wherein the program when executed by a processor, cause the processer to:

send a digest of data to be stored to a trusted execution environment;

receive combined information and a signature thereof returned by the trusted execution environment, wherein the combined information comprises the digest of the data to be stored, a timestamp and a monotonic counter value which are generated by the trusted execution environment and correspond to the data to be stored; and store the data to be stored, the combined information and the signature, comprising: writing the data to be stored into a preset data table of a database, and writing the combined information and the signature into a preset column of a row where the data to be stored is located, wherein the preset column comprises an implicit column.

16. The data processing apparatus according to claim 15, wherein the stored data comprises one or more pieces of data, and the determining whether the stored data is tampered with or not, according to the combined information and the signature(s) corresponding to the stored data comprises, for each piece of the one or more pieces of data:

generating a digest of the piece of data, and comparing the generated digest with a digest in combined information corresponding to the piece of data;

in response to the generated digest being consistent with the digest in the combined information, verifying a signature corresponding to the piece of data by using a public key corresponding to the trusted execution environment and the combined information corresponding to the piece of data; and in response to a successful verification of the signature corresponding to the piece of data, determining that the piece of data is not tampered with.

17. The data processing apparatus according to claim 16, wherein the determining whether the stored data is tampered with or not, according to the combined information and the signature(s) corresponding to the stored data further comprises, for a firstly stored piece of data in a preset data table among the one or more pieces of data:

acquiring a first timestamp and a first monotonic counter value from the trusted execution environment, and determining that there is no data deleted before the firstly stored piece of data, in a case where a timestamp corresponding to the firstly stored piece of data is equal to the first timestamp and a monotonic counter value corresponding to the firstly stored piece of data is equal to the first monotonic counter value; and/or determining that there is no data deleted or inserted between the firstly stored piece of data and a next piece of data, in a case where the timestamp corresponding to the firstly stored piece of data is earlier than a timestamp corresponding to the next piece of data, and the monotonic counter value corresponding to the firstly stored piece of data and a monotonic counter value corresponding to the next piece of data are consecutive.

18. The data processing apparatus according to claim 16, wherein the determining whether the stored data is tampered with or not, according to the combined information and the signature(s) corresponding to the stored data further comprises, for each intermediate piece of data which is neither lastly nor firstly stored in a preset data table among the one or more pieces of data:

determining that there is no data deleted or inserted between the intermediate piece of data and a previous piece of data, in a case where a timestamp corresponding to the intermediate piece of data is later than a timestamp corresponding to the previous piece of data, and a monotonic counter value corresponding to the intermediate piece of data and a monotonic counter value corresponding to the previous piece of data are consecutive; and/or determining that there is no data deleted or inserted between the intermediate piece of data and a next piece of data, in a case where the timestamp corresponding to the intermediate piece of data is earlier than a timestamp corresponding to the next piece of data, and the monotonic counter value corresponding to the intermediate piece of data and a monotonic counter value corresponding to the next piece of data are consecutive.

19. The data processing apparatus according to claim 16, wherein the determining whether the stored data is tampered with or not, according to the combined information and the signature(s) corresponding to the stored data further comprises, for a lastly stored piece of data in a preset data table among the one or more pieces of data:

determining that there is no data deleted or inserted between the lastly stored piece of data and a previous piece of data, in the case where a timestamp corresponding to the lastly stored piece of data is later than a timestamp corresponding to the previous piece of data, and a monotonic counter value corresponding to the lastly stored piece of data and a monotonic counter value corresponding to the previous piece of data are consecutive; and/or acquiring a current monotonic counter value from the trusted execution environment, and determining that there is no data deleted after the lastly stored piece of data, in the case where the timestamp corresponding to the lastly stored piece of data is earlier than a current time moment, and the monotonic counter value corresponding to the lastly stored piece of data is the same as the current monotonic counter value.

20. The non-transitory computer-readable storage medium according to claim 15, wherein the computer program when executed by the processor, further cause the processor to:

determine whether stored data is tampered with or not, according to combined information and a signature(s) corresponding to the stored data.

\* \* \* \* \*